Oct. 25, 1932.  C. E. LUCKE  1,884,777
LONGITUDINAL FLOW ECONOMIZER
Filed April 21, 1928   6 Sheets-Sheet 2

INVENTOR
Charles E. Lucke,
BY
Gifford & Scull
ATTORNEYS

Oct. 25, 1932.  C. E. LUCKE  1,884,777
LONGITUDINAL FLOW ECONOMIZER
Filed April 21, 1928  6 Sheets-Sheet 4

Fig-11

INVENTOR
Charles E. Lucke
BY
Gifford & Scull
ATTORNEYS

Oct. 25, 1932.   C. E. LUCKE   1,884,777
LONGITUDINAL FLOW ECONOMIZER
Filed April 21, 1928   6 Sheets-Sheet 5

INVENTOR
Charles E. Lucke
BY
Gifford & Scull
ATTORNEYS

Patented Oct. 25, 1932

1,884,777

UNITED STATES PATENT OFFICE

CHARLES E. LUCKE, OF NEW YORK, N. Y., ASSIGNOR TO THE BABCOCK & WILCOX COMPANY, OF BAYONNE, NEW JERSEY, A CORPORATION OF NEW JERSEY

LONGITUDINAL FLOW ECONOMIZER

Application filed April 21, 1928. Serial No. 271,682.

This invention relates to an economizer for heating boiler water in which the water is passed upwardly through tubes and the waste gases from the boiler pass longitudinally downwardly along the outside of the tubes so that the tubes will be swept by the gases and collection of dirt and soot thereon is decreased or entirely eliminated.

The invention will be understood from the description in connection with the accompanying drawings, in which.

Figure 1:
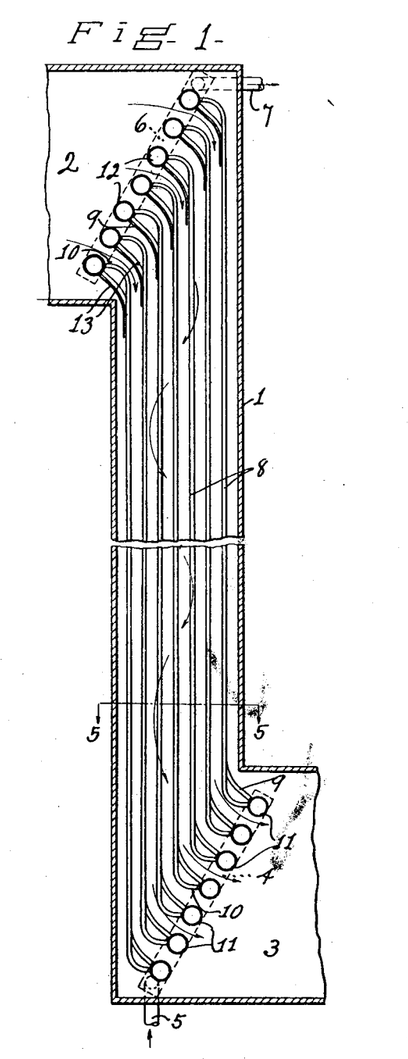
Fig. 1 is a vertical section through an illustrative embodiment of the invention.

In the drawings, reference character 1 indicates a vertically disposed metallic casing for the economizer having a hot gas inlet 2 at the upper end on one side and an outlet 3 for the waste gases at the lower end on the other side. An inclined inlet header 4 is disposed along the outside of the casing near the bottom and an inlet 5 for water to be heated leads to the header 4. An inclined outlet header 6, similar to the header 4, is located on the outside of the casing near the upper end thereof, and an outlet pipe 7 for the heated water leads away from the header 6.

Figure 5:
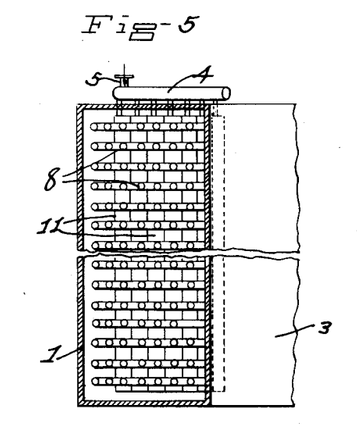
Fig. 5 is a section along the line 5—5 of Fig. 1.

Rows of vertical tubes 8 extend longitudinally through the casing 1 and have their ends bent in opposite directions, as shown at 9 and 10, along curves of different radii so that the tubes in each row enter cross headers 11 and 12 along different rows of holes. The headers 11 extend across the economizer and are connected to the header 4, while the headers 12 also extend across the economizer and are connected to the header 6. The headers 11 and 12 are installed so as to make two rows of headers, one at the top and the other at the bottom separated from each other to permit ingress and exit of the hot gases between these headers. Curved plates 13 are provided near the inlet 2 extending from the headers 12 to a short distance along the straight portions of the tubes 8 to guide the entering gases and cause them to be properly distributed and travel longitudinally along the tubes 8 through the economizer.

Figure 2:
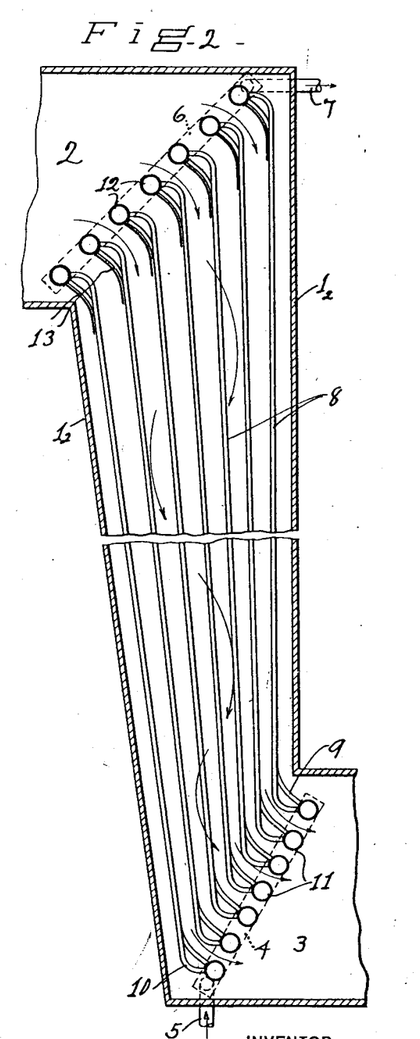
Figs. 2, 3 and 4 are similar sections through modifications.

In the modification shown in Fig. 2, the economizer is similar to the one already described but the walls $1_2$ on opposite sides taper toward each other downwardly so as to provide a tapering gas path to maintain the velocity of the gases as the gases decrease in volume due to being cooled while passing through the economizer.

In the modification shown in Fig. 3, portions similar to those already described in connection with Fig. 1 are designated by the same reference characters with the subscript "3". In this modification, a second casing $1'_3$ is provided that is similar to the casing $1_3$ and tubes $8'_3$ similar to the tubes $8_3$ are installed in this casing. The lower end of the casing $1_3$ is connected to the lower end of the casing $1'_3$ and the lower ends of the tubes $8_3$ and $8'_3$ are connected to cross headers 14 that are, in turn, connected to an A-shaped header 15 on the outside of the casing, so that the water that passes downwardly through the tubes $8'_3$ from the inlet header $4_3$ and cross headers $11_3$ passes by means of the headers 14 and 15 into the lower ends of the tubes $8_3$ and flows upwardly therethrough to the headers $12_3$, thence outwardly through the header $6_3$ and outlet $7_3$.

Figure 3:
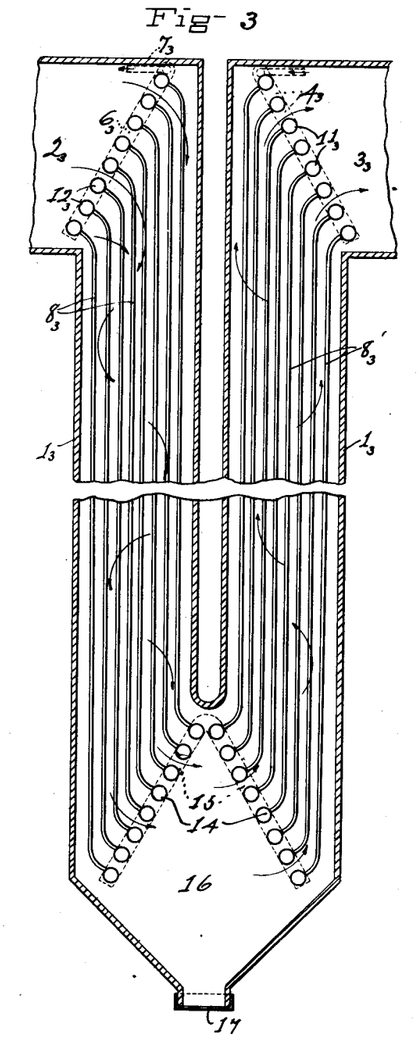

In the modification shown in Fig. 3, the water that passes downwardly through the tubes $8'_3$ is not heated to the highest temperature, so that the flow of water downwardly through these tubes will not be interfered with by the generation of steam or liberation of air bubbles. The steam that may be generated in the tubes $8_3$ rises upwardly with the water flowing upwardly through these tubes so that the flow is not interfered with. A soot pocket or dust chamber 16 is provided at the lower end of the device and an outlet 17 with a cover plate extends from the lower portion of the dust chamber.

Figure 4:
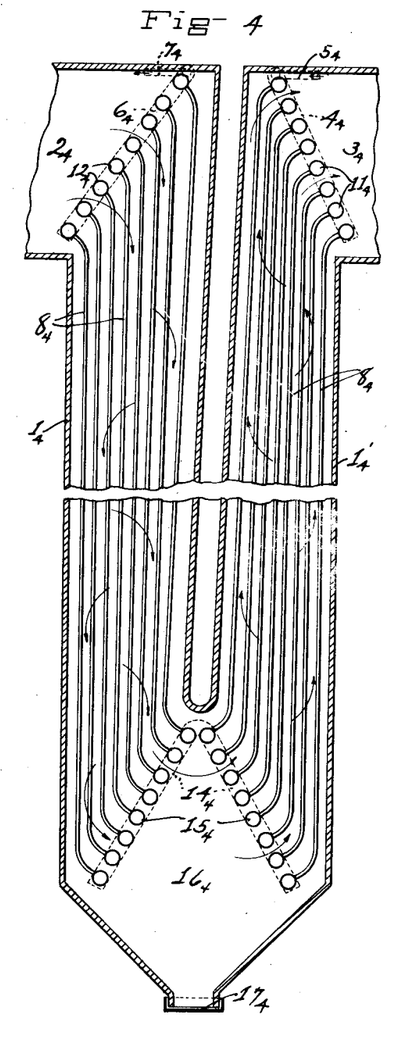

The modification shown in Fig. 4 is similar to that shown in Fig. 3 but the casings $1_4$ and $1'_4$ are made tapering to keep up the velocity of the gases as they are cooled. The elements in this modification are designated by the same reference characters as those in Fig. 3 with the subscript "4", and it is not thought necessary to repeat the description of the same.

Figure 6:
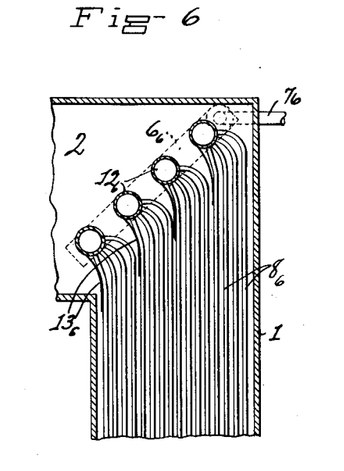
Fig. 6 is a section through the upper end of another modification.

In the modification shown in Fig. 6, the upper cross headers $12_6$ for the outlet are connected to the outlet header $6_6$ on the outside of the casing. The rows of tubes $8_6$ are more numerous per cross header $12_6$ than those shown in the other modifications and enter the headers along bends of different curvatures.

Figure 7:
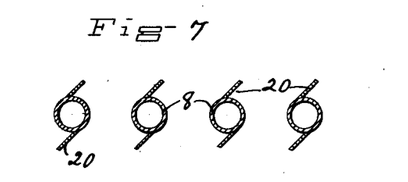
Figs. 7 to 10 are sections of tubes showing fins thereon.
Figure 8:
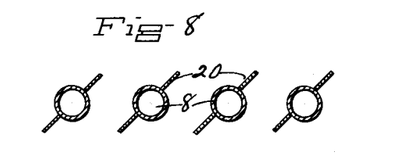
Figure 9:
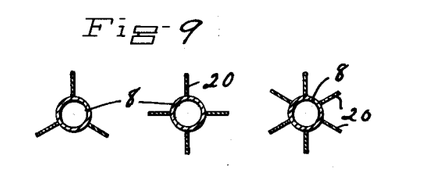
Figure 10:
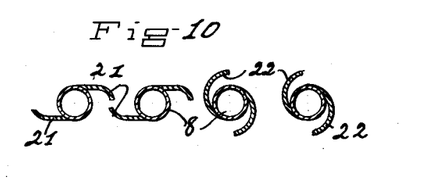

The tubes 8 extending longitudinally along the economizer casings may be provided with longitudinal ribs or fins to aid in absorbing heat from the hot gases because the gases flow longitudinally of the tubes and the fins will not interfere with the passage of the gases. All sides of tubes and fins are equally swept by gases without eddies or dead zones. In Fig. 7, a pair of fins 20 is shown for each tube, the fins being tangentially disposed on the tubes. In Fig. 8 the pair of fins 20 is shown radially disposed on the tubes. In Fig. 9, the tubes 8 are shown with 3, 4, and 6 radial fins 20, respectively. In Fig. 10 are shown tangential fins 21 on the tubes with their outer edges curved inwardly and fins 22 are also shown that are curved all the way and are attached in a tangential position to the tubes 8.

Figure 11:
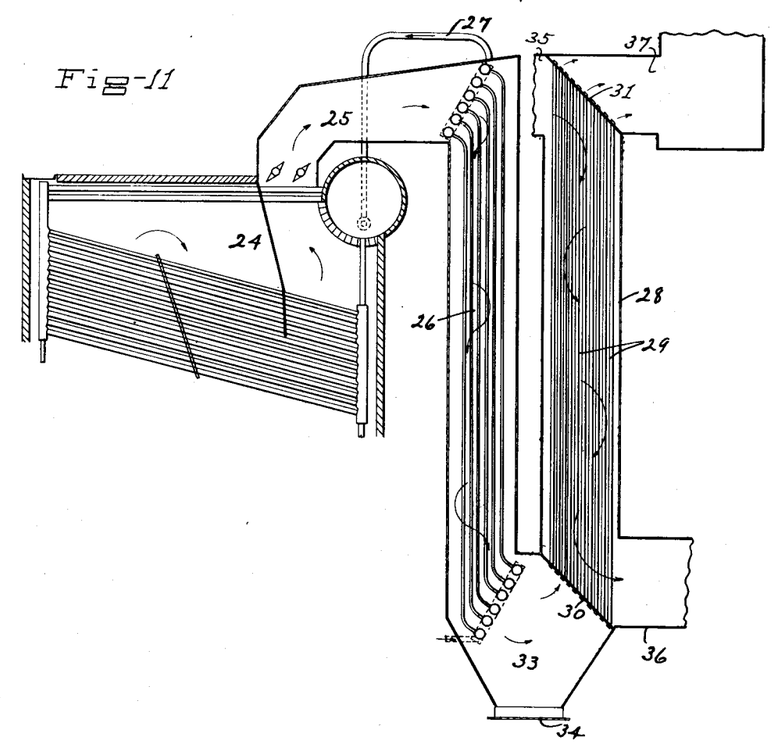
Fig. 11 is a vertical section showing part of a boiler, the economizer and an air heater.

In the modification shown in Fig. 11, the upper portion of a water tube boiler 24 is shown with the outlet 25 for waste gases leading therefrom. The outlet 25 leads to the economizer 26 that may be made as described above. A pipe 27 leads from the upper end of the economizer to the steam and water drum of the boiler. In this modification, an air heater 28 has its lower end connected to the lower end of the economizer 26 and longitudinal tubes 29 extending into tube plates 30 and 31 extend through the air heater and the waste gases pass through these tubes after passing longitudinally along the outside of the economizer tubes 26. A soot pocket 33 is provided at the lower ends of the economizer 26 and air heater 28 and an outlet 34 is located in the lower end of the soot pocket. The inlet for air to be heated is shown at 35 at the upper end of the air heater and the outlet for the heated air is shown at 36 at the lower end. The outlet 37 for the waste gases leads to a stack.

Figure 12:
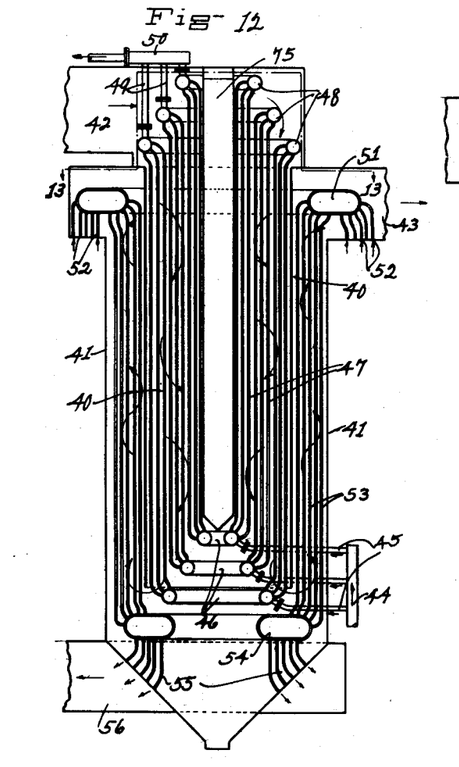
Fig. 12 is a section through a combined economizer and air heater.
Figure 13:
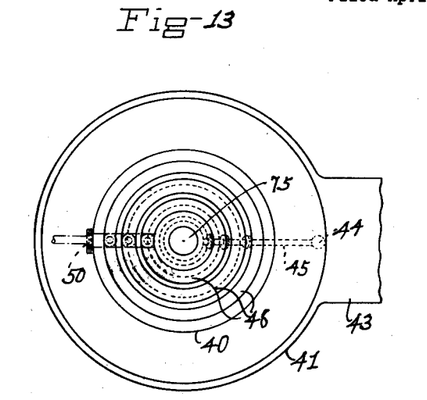
Fig. 13 is a section along the line 13—13 of Fig. 12.

In the modification shown in Figs. 12 and 13, the economizer and the air heater are made concentric with each other. The inside economizer section is shown at 40 and the outside air heater section at 41. The hot gases enter through the inlet 42 at the top of the economizer section and pass longitudinally of the economizer tubes around the lower edge of the section 40, thence upwardly longitudinally along the air heater tubes and out through the outlet 43. An inlet header 44 for feed water to be heated is shown at the bottom and is connected by pipes 45 to ring headers 46 from which annular rows of tubes 47 extend to similar ring outlet headers 48 at the top of the economizer. The headers 46 and 48 are located at different heights to provide spaces for the entry and exit of the hot gases. Pipes 49 extend from the outlet headers 48 to the header 50 from which connection may be made to the boiler.

An annular air inlet header 51 is located near the top of the air heater section 41 and air to be heated may be supplied to this header 51 through the air tubes 52. Rows of air tubes 53 extend from the header 51 longitudinally through the air heater section 41 to a similar annular air outlet header 54 at the lower end. Air tubes 55 extend from the outlet header 54 to the hot air outlet conduit 56.

Figure 14:
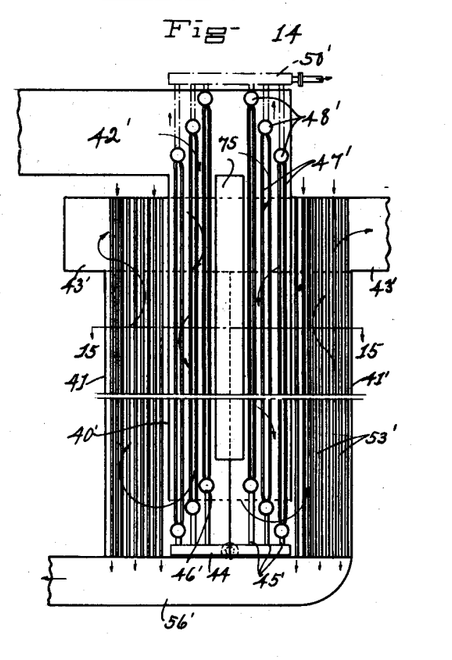
Fig. 14 is a vertical section through a modification of a combined economizer and air heater.
Figure 15:
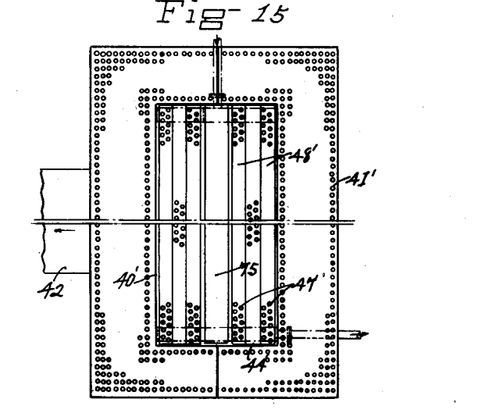
Fig. 15 is a section along the line 15—15 of Fig. 14.

In the modification shown in Figs. 14 and 15, the parts are similar to those described in connection with Figs. 12 and 13. In this modification, the economizer section 40' and the air heater section 41' are made square instead of round in cross-section and the other parts are made of appropriate shapes to correspond thereto. It is not believed it is necessary to describe all of the parts in detail and they will be readily understood from the description already given in connection with Figs. 12 and 13. Parts in this modification that correspond to similar parts in Figs. 12 and 13 are designated by the same reference characters with primes.

Figure 16:
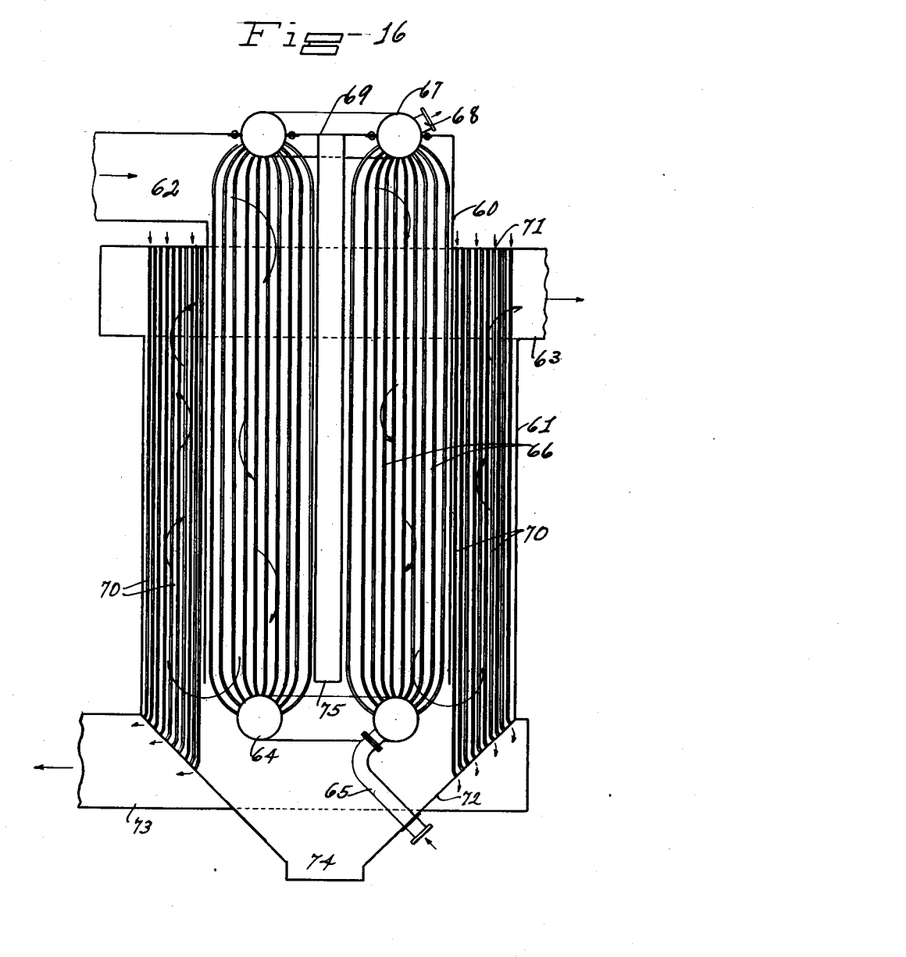
Fig. 16 is a vertical section through another modification of a combined economizer and air heater.

In the modification shown in Fig. 16, the inside economizer section is shown at 60 and the outside air heater section at 61. The inlet for the hot gases is shown at 62 and the outlet for the cooled gases at 63. A ring-shaped water inlet header 64 is located at the bottom and a feed water pipe 65 is connected to the same. Rows of tubes 66 extend from the header 64 longitudinally through the economizer and are connected to an upper ring-shaped outlet header 67 from which an outlet pipe 68 leads. The space surrounded by the header 67 at the top is closed by means of a plate 69. Annular rows of air tubes 70 extend through the air heater section 61 from a tube plate 71 along the upper side of the outlet 63 to a tube plate 72 at the bottom and a hot air outlet is shown at 73. A soot pocket or dust chamber is shown at 74.

In all of the illustrative embodiments where spaces would occur near the center to cause dead spaces for the gas or air, the spaces may be filled with closed boxes or cores that are indicated, for example, in Figs. 12, 13, 14, 15 and 16 by the reference character 75.

I claim:

1. A fluid heat exchange device comprising, in combination, walls forming a main passage for hot gases, means constituting a gas inlet passage extending transversely relative to the main passage and directing hot gases to the main passage, a plurality of headers arranged in a single row extending transversely of each passage at the juncture of the two passages with all of the headers located in each passage, tubes extending longitudinally of the main passage and connected to the headers, and means providing for the movement through the headers and tubes of a fluid to be heated by the hot gases passing in counter-current relation to the flow of the fluid in the tubes.

2. A fluid heat exchange device comprising, in combination, a main upright flue through which hot gases are passing, an inlet flue extending transversely relative to the main flue and joining it to direct hot gases thereto, a plurality of fluid conducting headers located in each flue and arranged in a single row extending transversely of each flue at its juncture with the other, fluid conducting tubes extending longitudinally of the main flue, and connected in rows to the headers, means extending along the tubes from the main flue side of the headers for deflecting the hot gases from the inlet flue and directing them between and along the rows of tubes, and means providing for the movement through the headers and tubes of a fluid to be heated by the hot gases passing in counter-current relation to the flow of fluid.

3. A fluid heat exchange device comprising, in combination, walls forming a tapered main flue with its cross-section decreasing in the direction of movement of hot gases through the flue, means constituting a hot gas inlet flue extending transversely of the main flue to a position of juncture therewith and directing hot gases to the main flue, a plurality of headers arranged in a single row located in each flue and extending transversely of each flue at its juncture with the other, converging rows of fluid conducting tubes extending longitudinally through the main flue with the tubes of each row connected to one of the headers, and means providing for the movement through the headers and tubes of a fluid passing in counter-current relationship to the flow of hot gases through the main flue.

4. A fluid heat exchange device comprising, in combination, a main flue through which hot gases are passing, gas inlet and outlet flues extending transversely relative to the flow axis of gases in the main flue and joined to the main flue at the inlet and outlet extremities respectively of that flue; a plurality of fluid outlet headers located in the inlet flue and the main flue and arranged in a row extending transversely of each of said flues at their junctures, a plurality of fluid inlet headers similarly arranged with respect to the main flue and outlet flue at their juncture, a plurality of rows of fluid conducting tubes extending longitudinally of the main flue with each row of tubes communicating at one end with an inlet header and at their other end with an outlet header, and means providing for the movement of a fluid to be heated through the tubes in counter-flow relation to the movement of hot gases passing through the main flue.

5. A fluid heat exchange device comprising, in combination, a main casing in the form of a U-tube through which hot gases are passing, an inlet flue extending transversely to one leg of the casing, and delivering hot gases to that part of the casing, a gas outlet flue extending transversely of the other leg of the casing to provide for the discharge of hot gases from the casing, a bank of fluid conducting tubes arranged in rows in each leg of the casing with the tubes extending longitudinally thereof, a plurality of fluid inlet headers located in the outlet flue and one leg of the casing, and arranged in a row extending transversely of each of the passages provided thereby, a plurality of headers located at the end of the casing leg opposite the outlet flue and arranged obliquely relative to the flow axis of the gases in that leg, a third set of headers arranged in the remaining casing leg in a row oblique to the flow axis of the gases passing in that leg, means for supplying fluid to the first set of headers for movement from those headers to the second set of headers, means providing for the flow of fluid from the second set of headers to the third set, a soot collection chamber formed by the base of the casing and the second and third sets of headers, a fourth set of headers located in the inlet flue and the adjacent leg of the casing and arranged in a row extending transversely of each of these passages, a bank of tubes extending longitudinally of the last mentioned leg of the casing and connecting the third and fourth sets of headers to provide for the counter-flow movement of fluid in said leg, and common discharge means receiving the fluid from the last mentioned headers.

6. In fluid heat exchange apparatus, upper and lower headers, a bank of upright tubes connecting the headers, a casing around the tubes for directing furnace gases along and around the tubes in a direction counter to the direction of the flow of fluid in the tubes, a second casing surrounding the first casing and having a hopper shaped lower end forming a collection chamber for the deposit of solids from the furnace gases, a bank of air heating tubes surrounding the first casing and located between the casings, means supplying hot furnace gases to the first casing for travel along the first tubes and subsequent passage into the chamber between the two casings and then along the tubes in that chamber, a discharge flue providing for the passage of the furnace gases from the second casing, and means extending around the second casing providing for the removal of air after it has been heated by its passage through the air heating tubes.

7. A fluid heat exchange device comprising, in combination, walls forming a main passage for hot gases, means constituting a gas inlet passage extending transversely relative to the main passage and directing hot gases to the main passage, a plurality of headers arranged at the juncture of the two passages in a single row extending transversely of each passage and obliquely to the flow axis of the gases moving through the passages, with all of the headers located in such passages, tubes extending longitudinally of the main passage and connected to the headers, and means providing for the movement through the headers and tubes of a fluid to be heated by the hot gases passing in counter-current relation to the flow of the fluid in the tubes.

8. A fluid heat exchange device comprising, in combination, a main flue through which hot gases are passing, an inlet flue extending transversely relative to the main flue and joining it to direct hot gases thereto, a plurality of fluid conducting headers arranged in a single row extending obliquely of the flow axis of the gas current in each flue at its juncture with the other, fluid conducting tubes extending longitudinally of the main flue and connected in rows to the headers, a curved plate extending along the tubes of each row from the main flue side of the headers for deflecting the hot gases from the inlet flue and directing them between and along the rows of tubes, and means providing for the movement through the headers and tubes of a fluid to be heated by the hot gases passing in counter-current relation to the flow of the fluid.

9. A fluid heat exchange device comprising, in combination, walls forming a tapered main flue having a cross-section decreasing in the direction of movement of hot gases through the flue, means constituting a hot gas inlet flue extending transversely of the main flue to a position of juncture therewith and directing hot gases to the main flue, a plurality of headers arranged in a single row extending obliquely of each flue at its juncture with the other, rows of fluid conducting tubes extending longitudinally through the main flue with the tubes of each row connected to one of the headers, and means providing for the movement through the headers and tubes of a fluid passing in counter-current relationship to the flow of hot gases through the main flue.

10. A fluid heat exchange device comprising, in combination, a main flue through which hot gases are passing, gas inlet and outlet flues extending transversely relative to the flow axis of gases in the main flue and joined to the main flue at the inlet and outlet extremities respectively of that flue, a plurality of fluid outlet headers located in the inlet flue and the main flue and arranged in a row extending obliquely of each of said flues at their juncture, a plurality of fluid inlet headers similarly arranged with respect to the main flue and outlet flue at their juncture, and a plurality of rows of fluid conducting tubes extending longitudinally of the main flue and connected to the headers.

11. A fluid heat exchange device comprising, in combination, a main casing in the form of a U-tube having inlet and outlet legs through which hot gases are passing, a bank of fluid conducting tubes arranged in rows in each leg of the casing with the tubes extending longitudinally thereof, a row of fluid inlet headers arranged obliquely in the outlet leg of the casing, a plurality of headers located at the opposite end of the outlet leg and arranged obliquely relative to the flow axis of the gases in that leg, a third set of headers arranged in the remaining casing leg in a row oblique to the flow axis of the gases passing in that leg, means for supplying fluid to the first set of headers for movement from those headers to the second set of headers, means for providing for the flow of fluid from the second set of headers to the third set, a gas expansion chamber formed by the base of the casing and the second and third sets of headers, a fourth set of headers located in the inlet leg of the casing and arranged in a row extending obliquely of that leg, a bank of tubes extending longitudinally of the last mentioned leg of the casing and connecting the third and fourth sets of headers to provide for the counter-flow movement of fluid in said leg, and discharge means receiving the fluid from the last mentioned headers.

12. A fluid heat exchange device comprising, in combination, walls forming a U-shaped main flue with each leg having its cross-section decreasing in the direction of movement of hot gases through it, means constituting a hot gas inlet flue extending to the main flue and directing hot gases to the main flue, a plurality of headers arranged in a single row located at each end of each leg of the main flue and extending obliquely of each leg, converging rows of fluid conducting tubes extending longitudinally through each leg of the main flue with the tubes of each row connected at both ends to one of the headers, and means providing for the movement through the headers and tubes of a fluid passing in counter-current relationship to the flow of hot gases through the main flue.

13. A fluid heat exchange device comprising, in combination, a U-shaped main flue through which hot gases are passing, gas inlet and outlet flues extending transversely relative to the flow axis of the gases in the main flue and joined to the main flue at the inlet and outlet extremities respectively of that flue, a plurality of fluid outlet headers located in the inlet flue and the main flue and arranged in a row extending transversely of each of said flues at their juncture, a plurality of fluid inlet headers similarly arranged with respect to the main flue and outlet flue at their juncture, converging rows of intermediate headers at the mid-portion of the main flue, a plurality of rows of fluid conducting tubes extending longitudinally of the main flue with each row of tubes communicating at both ends with the headers, and means providing for the movement of a fluid to be heated through the tubes in counter-flow relation to the movement of hot gases passing through the main flue.

14. A fluid heat exchange device comprising, in combination, a main flue in the form of a U-tube and having tapered legs, an inlet flue extending transversely to one leg of the casing, and delivering hot gases to that part of the casing, a gas outlet flue extending transversely of the other leg of the casing to provide for the discharge of hot gases from the casing, a bank of fluid conducting tubes arranged in converging rows in each leg of the casing with the tubes extending longitudinally thereof, a plurality of fluid inlet headers located in the outlet flue and one leg of the casing, and arranged in a row extending transversely of each of the passages provided thereby, a plurality of headers located at the end of the casing leg opposite the outlet flue and arranged obliquely relative to the flow axis of the gases in that leg, a third set of headers arranged in the remaining casing leg in a row oblique to the flow axis of the gases passing in that leg, means for supplying fluid to the first set of headers for movement from those headers to the second set of headers, means for providing for the flow of fluid from the second set of headers to the third set, a deposit collection chamber formed by the base of the casing and the second and third sets of headers, a fourth set of headers located in the outlet flue and the adjacent leg of the casing and arranged in a row extending transversely of each of these passages, converging rows of tubes extending longitudinally of the last mentioned leg of the casing and connecting the third and fourth sets of headers to provide for the counter-flow movement of fluid in said leg, and a main discharge means receiving the fluid from the last mentioned headers.

15. In fluid heat exchange apparatus, inlet and outlet headers, a bank of tubes connecting the headers, a casing around the tubes for directing furnace gases along and around the tubes in a direction counter to the direction of the flow of fluid in the tubes, a second casing surrounding the first casing, a bank of air heating tubes surrounding the first casing and arranged in the chamber between the casings, means supplying hot furnace gases to the first casing for travel along the first tubes and subsequent passage into the chamber between the two casings and then along the tubes in that chamber, a discharge flue providing for the passage of the furnace gases from the second casing, and means extending around the second casing providing for the removal of air after it has been heated by its passage through the air heating tubes.

16. In fluid heat exchange apparatus, upper and lower ring-shaped headers, an annular bank of upright tubes connecting the headers, a cylindrical casing around the tubes for directing furnace gases along and around the tubes in a direction counter to the direction of the flow of fluid in the tubes, a second casing concentric with and surrounding the first casing and having a hopper shaped lower end forming a collection and expansion chamber, a bank of air heating tubes surrounding the first casing and located between the two casings, means supplying hot furnace gases to the first casing for travel along the first tubes, means providing for the subsequent passage into the chamber between the two casings and then along the tubes in that chamber, a discharge flue providing for the passage of the furnace gases from the second casing, and means extending around the second casing providing for the removal of air after it has been heated by its passage through the air heating tubes.

17. An air heater comprising, in combination, a ring shaped inlet header for the passage of air to be heated, a ring shaped outlet header, an annular bank of tubes connecting said headers, means connected to the inlet header to afford a supply of air to be heated, a casing surrounding the bank of tubes, and means providing for the movement of a heating medium along the tubes between the headers.

CHARLES E. LUCKE.